June 12, 1923.

C. A. SAWYER, JR
LEATHER CUTTING MACHINE
Filed April 9, 1921

Inventor:
Charles A. Sawyer Jr.
by James R. Hodder
atty.

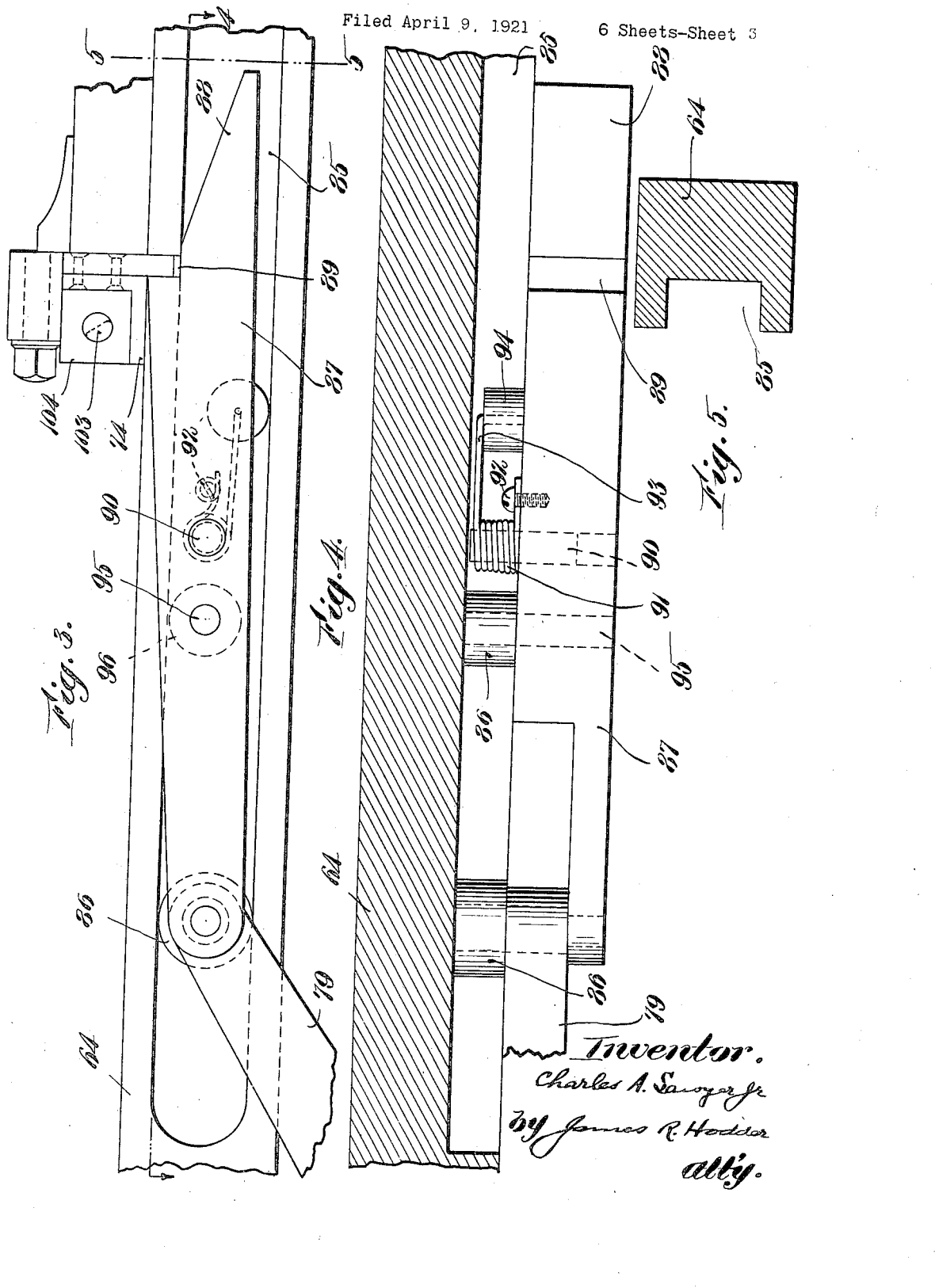

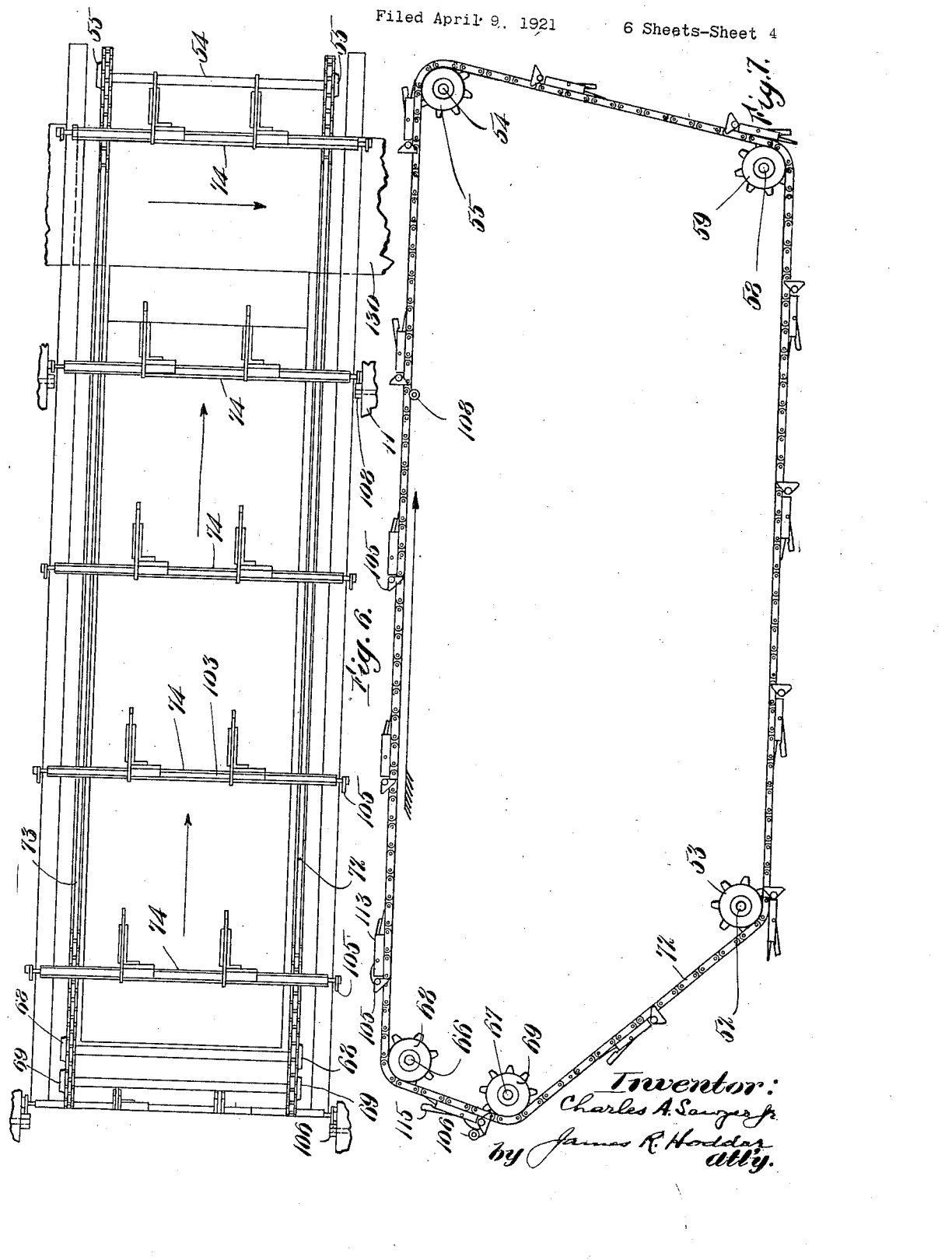

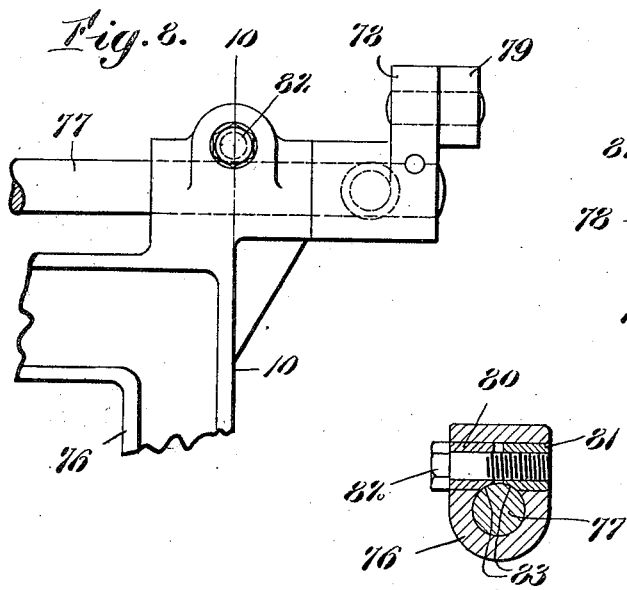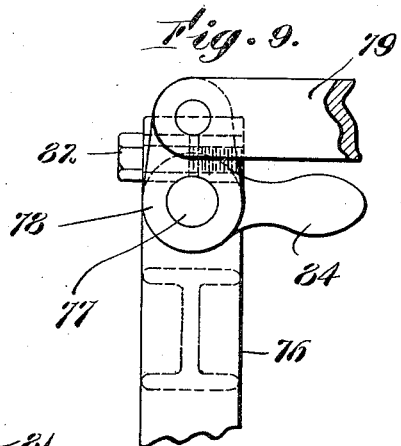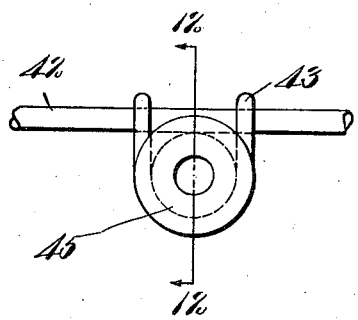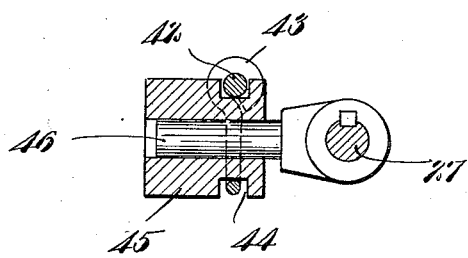

June 12, 1923.
C. A. SAWYER, JR
LEATHER CUTTING MACHINE
Filed April 9, 1921
1,458,550
6 Sheets-Sheet 6
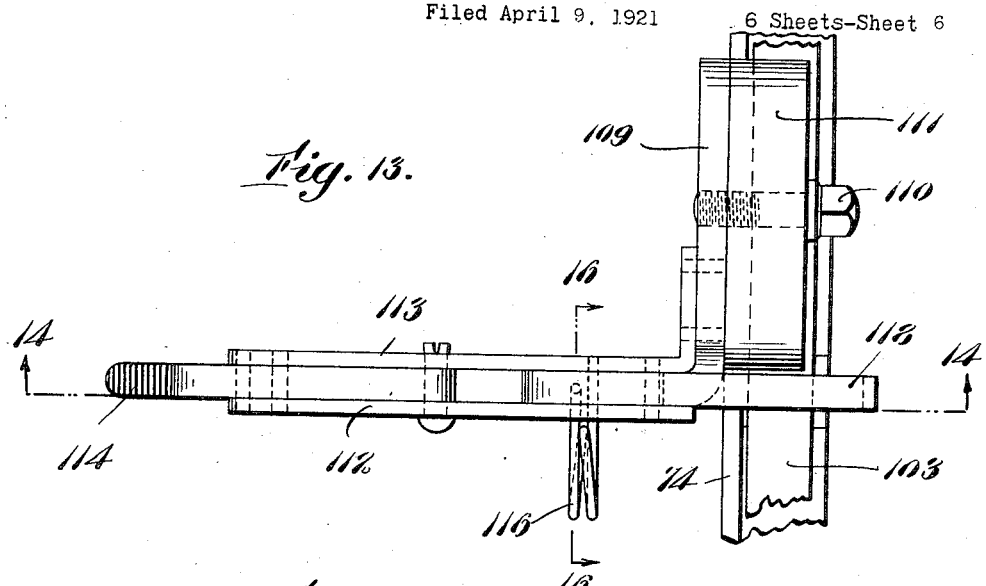
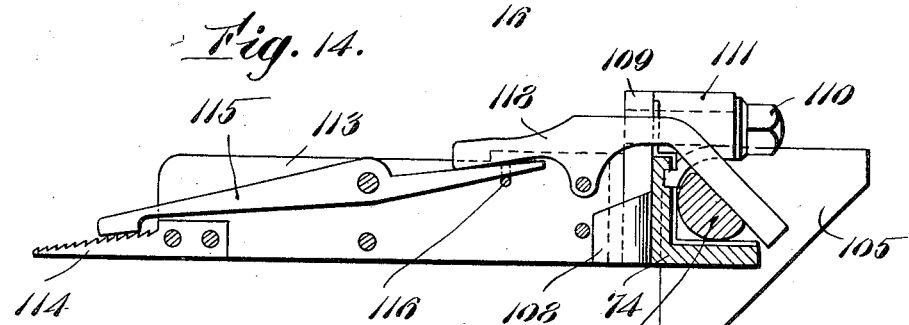
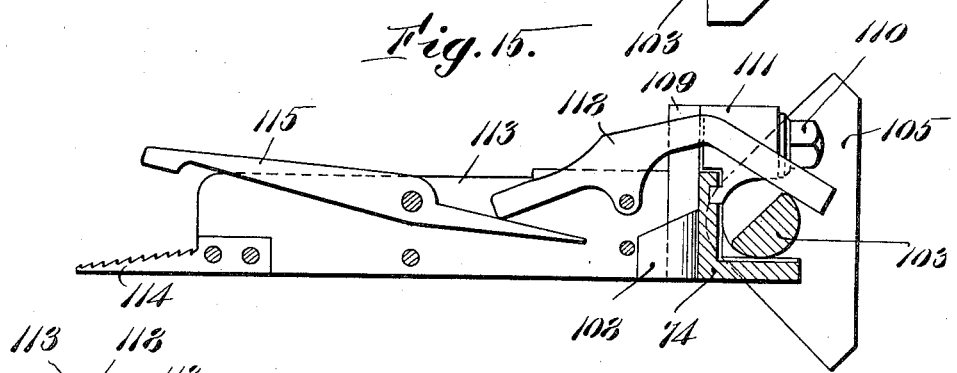
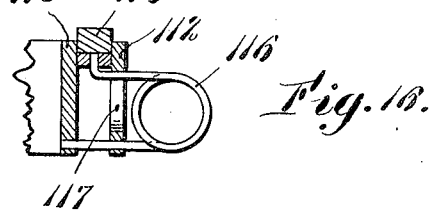
Inventor
Charles A. Sawyer Jr.
by James R. Hodder
att'y.

Patented June 12, 1923.

1,458,550

UNITED STATES PATENT OFFICE.

CHARLES ADRIAN SAWYER, JR., OF NEWTON, MASSACHUSETTS.

LEATHER-CUTTING MACHINE.

Application filed April 9, 1921. Serial No. 460,116.

*To all whom it may concern:*

Be it known that I, CHARLES ADRIAN SAW-YER, Jr., a citizen of the United States, and resident of Newton, in the county of Middlesex and State of Massachusetts, have invented an Improvement in Leather-Cutting Machines, of which the following description, in connection with the accompanying drawings, is a specification, like letters on the drawings representing like parts.

My present invention relates to leather working machines, and more particularly to a sole blank cutting machine in which sole blanks are continuously fed to reciprocating cutters. In my Patent No. 1,368,225, granted Feb. 8, 1921, I have described and claimed the novel features of construction and arrangement of parts in a leather working machine known as a dinker. In my Patent No. 1,378,138, granted May 17, 1921, I have described and claimed a sole blank cutting machine with adjustable knives, certain features of the machine described and claimed in my patent above referred to, being shown and described in said copending application. In my present invention I may or may not use the adjustable knives referred to in my copending application, but preferably use as a basis for my present invention, the machine described and claimed in the patent and application above referred to. While these machines are efficient and rapid in operation, and the product thereof is perfect in every respect, yet I have striven in the present machine to devise a machine that will be perfectly safe for the operator and such operator may be relatively unskilled and yet increase the total product from such machine. I find that there is a tendency on the part of the operator, whether skilled or unskilled, to be slightly nervous when placing blanks beneath the reciprocating cutters and this nervousness persists even when the operator is safeguarded by all known safety devices. In my present invention, therefore, I have devised a feeding means for continuously and intermittently feeding sole blanks under and across the path of the reciprocating knives and place the feeding point at which the blanks are fed into the machine, at such a distance in front of the knives, that no danger from the knives to the operator is possible even when no safety devices are used. Again, by making the distance from the feeding point to the knives of sufficient length, I am enabled to provide that a plurality of sole blanks will be always in view of the operator so that he may ascertain whether or not such blanks are correctly positioned and if not, to have the means at hand to immediately stop the machine and correct the position of such blanks. In a machine of this character it is possible to have the knives reciprocate continuously, i. e., to have the main shaft of the machine rotate continuously and the knives reciprocated, at predetermined intervals of time, as distinguished from a machine in which the reciprocation of the knives is caused by the operator throwing a clutch either by hand or by a foot treadle. As in such machines there must be a certain cooperation between the movement of the knives and the travel of the carrier on which the sole blanks are located, it is possible, should the knives and the carrier fail to function in synchronism for the knives to descend at a time when the shoe sole blank is not properly positioned beneath such knives. As I have devised the sole blank carriers to be carried under the knives by a cross-bar of metal, it is obvious that the descent of the knives at the wrong time would wreck the knives if not entirely wreck the machine. I have, therefore, devised a safety means which cooperates directly with the movable sole blank carrier to control the operation of a clutch mechanism whereby it will be impossible for the clutch to operate to cause a movement of the cutters, unless the sole blank is properly positioned.

While I have shown such safety means in the present application and in describing the operation of my machine will necessarily describe the operation of such safety means in detail, I have not claimed the same herein, as I have described and claimed the same in my Patent No. 1,375,935, dated April 26, 1921.

One of the novel features of my present invention is an improved form of carrier device for machines of this character, in which the sole blanks are positively gripped and held in position from the feeding point until the blank is cut into a plurality of soles, after which the gripping device releases the blank and allows the cut soles to be fed from the machine and into any desired place or position.

Another feature of my invention is an improved means for intermittently operating a continuous, endless sole blank carrier, together with means for altering the length of feed of such carrier within predetermined limits.

Still another object and feature is an improved means for locking and unlocking the sole blank gripping device. A still further feature is an improved means for feeding the cut soles from the cutters onto a transverse belt, the feeding means operating at a greater speed than the carrier.

In the accompanying drawings,

Fig. 3 is an enlarged detail of the means for moving the endless carrier step by step;

Fig. 4 is a sectional view on the line 4—4 of Fig. 3;

Fig. 5 is a detail of a section on the line 5—5 of Fig. 3;

Fig. 6 is a plan view of the endless carrier;

Fig. 7 is a side elevation thereof;

Fig. 8 is a front elevation of a detail of a portion of the clutch operating mechanism;

Fig. 9 is a side elevation of Fig. 8;

Fig. 10 is a section on the line 10—10 of Fig. 8;

Fig. 11 is a detail of another portion of the clutch operating mechanism; and

Fig. 12 is a section on the line 12—12 of Fig. 11;

Fig. 13 is a plan view of the leather gripping device mounted in position on a cross bar;

Fig. 14 is a sectional elevation on the line 14—14 of Fig. 13, showing the gripping jaws in closed position;

Fig. 15 is a sectional view on the line 14—14 of Fig. 13, showing the gripping jaws in operative or open position; and Fig. 16 is a detail of the gripping jaw operating spring.

Figure 1:
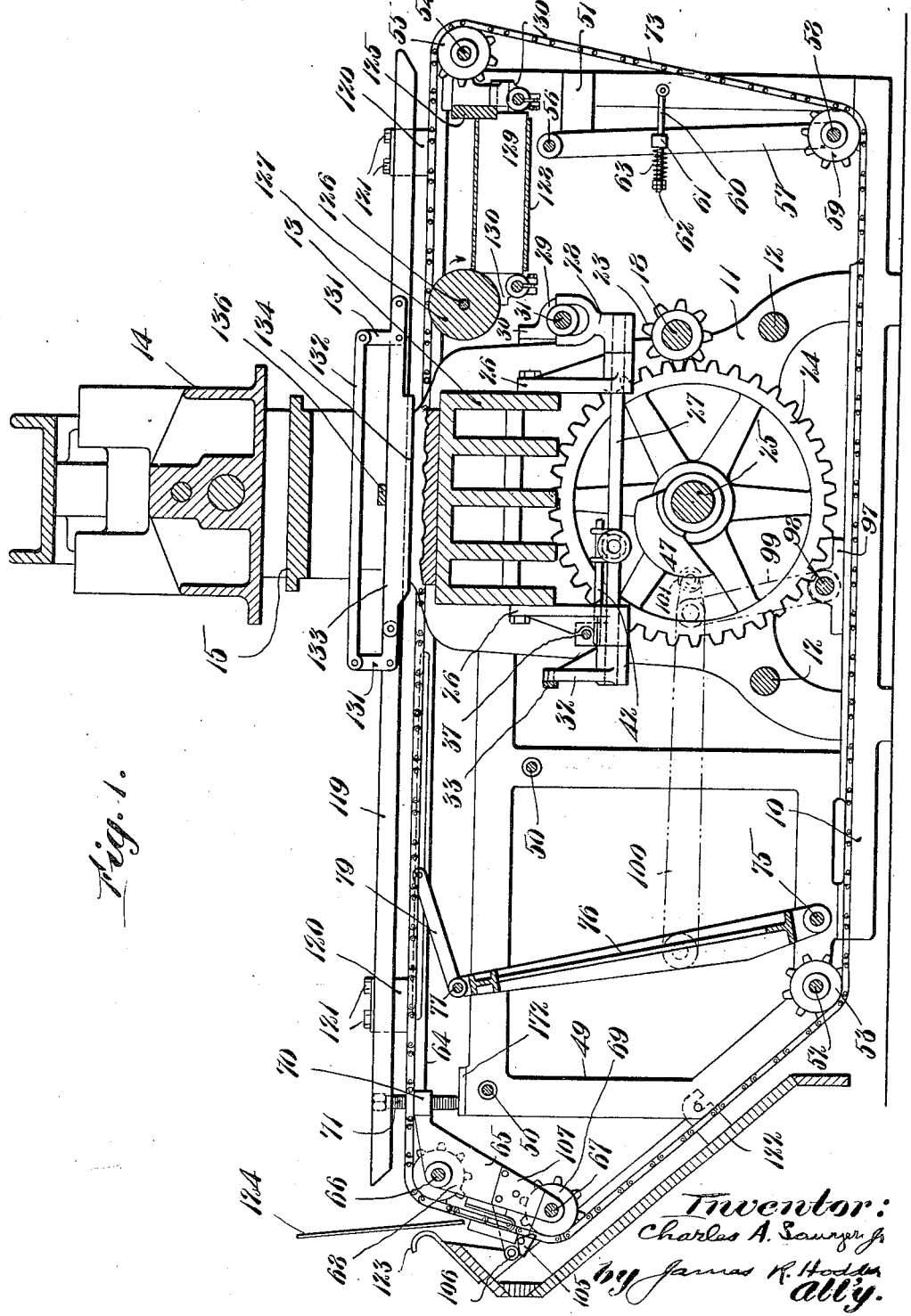
Fig. 1 is a side elevation, partly in section of a sole blank cutting machine embodying my invention.

Referring to the drawings 10 designates a base on which is mounted standards or uprights 11 spaced apart and held in position by bars 12. Intermediate the ends of the standards 11 is a bed 13 on which is mounted a block of wood or other suitable material, on which the leather strips are placed to be cut into sole blanks. In the upper part of the standards 11 is an adjustable cross-head 14 in which is mounted, for reciprocation, a cutter head 15, the cross head 14 being adjustable vertically by means of suitable gears and shafts operated by a hand wheel 17. The standards 11 are tied together at the top by a cross-plate 16.

A shaft 18 mounted in suitable bearings on the standards 11, is provided at one end with a rotatable pulley 19, fly wheel 20, and one member 21 of a clutch. Attached to the shaft 18 is another member 22 of the clutch, and provision is made for bringing the members 21 and 22 into or out of engagement with each other to control the operation of the shaft 18. Intermediate the ends of the shaft 18 are secured the spur gears 23 which mesh with the gears 24 mounted on the rotatable shaft 25 in the standards 11. Through suitable connections between the shaft 25 and the cross head 14, said cross head is reciprocated. As, however, such forms of connections are well known, and as the details of the same do not concern my present invention, they will not be further described herein. Such connections and their manner of operation, are clearly shown and described in my patent above referred to, and reference is herein made to said patent for a full description of such connections.

Figure 2:
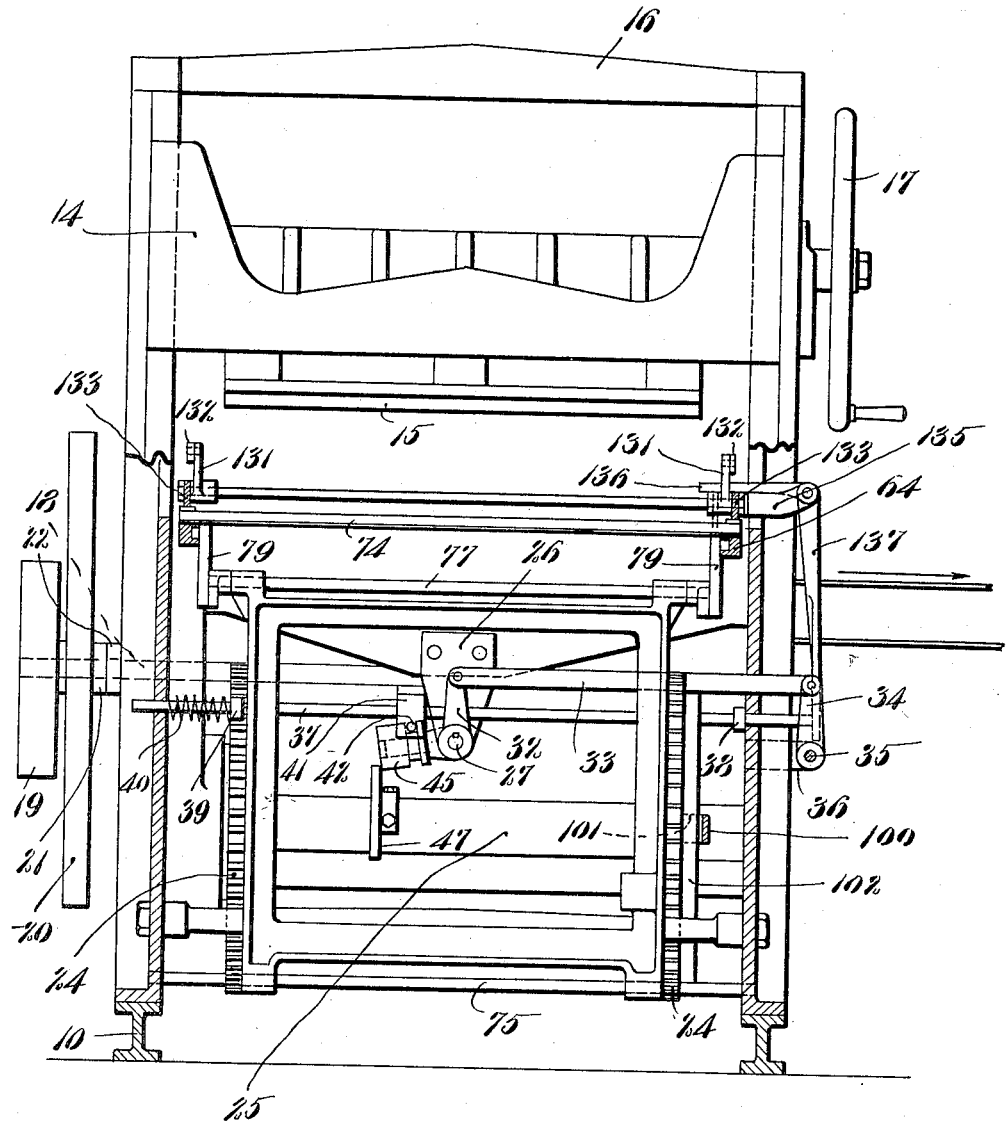
Fig. 2 is an end elevation, partly in section, showing the details of the safety clutch operating device.

Bearing brackets 26, attached to either side of the bed 13, have rotatably mounted therein a shaft 27. At the rear of said shaft, or at the right hand side of Fig. 1, is securely fastened a clutch operating fork 28, which cooperates with a groove 29 in the member 30 slidably mounted on a shaft 31 mounted on the standards 11. At the front end of the shaft 27 is secured a crank arm 32, to the free end of which is pivotally attached one end of a connecting rod 33, the other end of which is pivotally attached to the free end of the crank arm 34, secured to a shaft 35 rotatably mounted in bearing brackets 36 on one of the standards 11. Slidably mounted in the standards 11, and parallel to the shaft 25, is a rod 37, provided near one end with a stop 38 which engages with one of the standards 11 to limit the movement of said rod to the right, as viewed in Fig. 2. Near the other end of the rod 37 is a stop 39 and on the rod and between the stop and the standard 11 to the left of the machine, as viewed in Fig. 2, is a coiled spring 40, which tends to force the rod 39 to the right. Adjustably mounted on the rod 37 is a block 41 carrying a pin or rod 42 which extends rearwardly of the machine and carries a wire loop 43 which cooperates with a circular groove 44 in a roller 45 rotatably mounted on a stub shaft 46 secured to the shaft 27. As shown in Fig. 2, this roller lies slightly to the right of the cam 47 secured to the shaft 25. There is an operating handle (not shown) secured to the shaft 35 and positioned within easy and convenient reach of the operator, who stands at the front of the machine, or at the extreme left of Fig. 1. By means of this handle (not shown) the clutching mechanism above described may be controlled by the operator. Automatic safety means for preventing operation of the clutch mechanism will be hereinafter described.

Mounted on the base 10, at the front of the standards 11, are frame members 49 spaced apart and held in position by rods 50, while on the base and at the rear of the standards 11 is a frame 51. In the frame members 49 is a rotatable shaft 52 on which are secured chain sprockets 53, but one of which is shown. In the frame 51, at the upper end thereof, is a shaft 54 on which are secured chain sprockets 55. Pivotally mounted on a shaft 56 in the frame 51 is a frame 57, carrying a shaft 58 at its lower end on which are secured chain sprockets 59. A threaded bolt 60, pivotally mounted on the frame 51 extends through a boss 61 on the frame 58 and is provided with nuts 62. Between the nuts 62 and boss 61 is a coiled spring 63 tending to swing the lower end of the frame 57 to the rear of the machine. Pivotally mounted on the shaft 54 is a frame 64 which extends forwardly the entire length of the machine, the forward end being provided with downwardly extending side plates 65 carrying shafts 66 and 67 on which are mounted chain sprockets 68 and 69 respectively. On the side members, adjacent the side plates 65, are bosses 70 through which extends studs 71, which engage with spot faces 172 on the frame members 49, this construction providing means for raising or lowering the forward end of the frame 64. Passing over the chain sprockets 53, 55, 59, 68 and 69 on either side of the machine are chains 72 and 73 respectively, and extending between and secured to said chains at suitable intervals along the length of said chains are cross bars 74. These cross bars 74 slide along the top of the frame 64, as will be obvious from an inspection of Figs. 1 and 3, and the chains 72 and 73 will be held taut as they run on the sprockets by the tension exerted on the sprocket 59 by the coil spring 63, above described. A shaft 75 in the frame members 49 has pivotally mounted thereon a frame 76 carrying at its upper end a shaft 77. At each end of the shaft 77 is secured a crank 78 having pivotally mounted at its free end a connecting rod 79. The shaft 77 is securely fastened in the frame 76 against rotative movement, by a locking means comprising two collars 80 and 81, one, 81, threaded to receive the threads of a bolt 82, and the other 80, providing clearance for said bolt. Each of the collars 80 and 81 are cut away at 83 on the radius of the shaft 77. This construction is easy to operate and securely holds the shaft and frame against relative movement. The purpose of this construction is to adjust the forward movement of the connecting rod 79 and parts operated thereby, as will be hereinafter described. The cranks 78 are provided with a handle 84 to facilitate manipulation of the device.

The side members of the frame 64 are each provided, on their inner ends or face, with a groove 85 in which is mounted a roller 86 on a shaft extending through the rear end of the connecting rod 79, and the forward end of the feeding device 87. The rear end of the feeding device is bevelled at 88 and is provided with a notch 89 for engaging with the cross bars 74 extending between the chains 72 and 73. Intermediate the ends of the feeding device 87 is the rod 90 extending into the groove 85 and on this rod is a coil spring 91, one end being attached to the feeding device 87 by a screw 92, while the other end 93 extends rearwardly, and is bent at right angles to support and carry a roller 94, which rides on the lower face of the groove 85. The spring 91, therefore, tends to move the feeding device 87 upwardly, always keeping such feeding device in position to engage with the cross bars 74. A rod 95 on which is rotatably mounted a roller 96 that is adapted to engage with the upper face of the groove 85, limits the upward movement of the rear end of the feeding device 87. On the base 10, beneath the standards 11, are mounted bearing blocks 97, in which is mounted a shaft 98 that has attached thereto the lower end of a connecting rod 99, the upper end of this rod being pivotally mounted intermediate the ends of a connecting rod 100. The forward end of this connecting rod 100 is pivotally attached to the swinging frame 76, while the rear end is provided with a roller 101 that engages in the groove of a cam 102 attached to the side of the right hand gear 24. It will be obvious, therefore, that rotation of the gear 24 will cause a reciprocation of the connecting rod 100, with the consequent swinging movement of the frame 76, and a step-by-step feeding movement of the chains 72 and 73 and cross bars 74 because of the feeding devices 87 successively engaging said cross bars. Furthermore, that by properly proportioning the various elements above described, and manipulating the adjusting mechanism illustrated in Figs. 8, 9 and 10, the limit of the rearward movement of each cross bar 74 can be accurately determined.

The cross bars 74 are preferably formed of angle iron and in the angle thereof is rotatably mounted a half-round shaft 103, suitable bearings 104 being provided at the ends of the cross bars for this purpose. On each end of the half round shaft 103 is secured a substantially triangular member 105 adapted to engage with rollers 106 on studs mounted on plates 107 secured to the downwardly extending members 65 at the front of the machine, and with rollers 108 mounted on studs secured to the standards 11, as shown in Figs. 1, 6 and 7. Referring to these figures and to Figs. 14 and 15, it will be seen that assuming the shaft 103 and triangular members 105 to occupy the position shown in Fig. 15, or the position shown in Fig. 7, relative to the rollers 106, and the chains 72 and cross bars 74 move past the rollers 106 in the direction of the arrow shown in Fig. 6, the rollers 106 will engage the triangular members 105 and rotate the shaft 103 into the position shown in Fig. 14 or Fig. 7. Mounted on the cross bars 74 are leather gripping devices composed of a body member 108, one end, designated 109, being bent at right angles and provided with a threaded hole to receive a bolt 110 that passes through a clamp device 111 for securely holding the gripping device in any desired position along the length of the cross bar. Side plates 112 and 113 are riveted to the member 108 and extend laterally of the portion 109 and have riveted to their lower outer end a toothed gripping jaw 114. A jaw 115 cooperates with the gripping jaw 114, being pivotally mounted in the side plates 112 and 113, and has attached to the end remote from the gripping portion, the end of a spring 116, the other end of which spring is attached to the side plates 112 and 113. A slot 117, in the side plate 112, allows movement of the end of the spring 116 that is attached to the jaw 115. This spring 116 tends to force the jaw 115 into engagement with the gripping jaw 114. An operating lever 118, pivotally mounted in the side plates 112 and 113, has one end engaging the spring attaching end of the jaw 115, while the other end extends over the crossbar 74 and engages the half round shaft 103, as clearly shown in Figs. 14 and 15. Referring particularly to these figures it is apparent that with the half round shaft 103 in the position relative to the cross bar 74 shown in Fig. 14, the jaw 115 is forced into engagement with the gripping jaw 114 by the spring 116, while if the half round shaft 103 is rotated into the position shown in Fig. 15 by the triangular members 105 engaging with the rollers 108 on the standards 11, one end of the operating lever 118 will be raised and the other depressed to lift the jaw 115 out of engagement with the gripping jaw 114.

Mounted on the side members of the frame 64 and extending the entire length thereof are bars 119, said bars being spaced from the side members by blocks 120, and attached thereto by bolts 121. These bars 119 prevent the cross-bars 74 from lifting upward.

Mounted on the front of the frame members 49 is an apron 122, provided at its upper end with a curved plate 123, that assists the operator in placing the sheets or trips 124 of leather, or other material to be cut, in position in the gripping devices illustrated in detail in Figs. 13, 14, 15 and 16.

A frame 125, attached to the frame 51, has rotatably mounted therein, parallel to the shaft 25, a shaft 126 carrying a roll 127 that extends across the width of the frame 64. Provision is made for rotating this roll at a greater surface speed than the speed of travel of the chains 72 and 73, but as the particular means for rotating the roll does not concern my present invention, it has not been shown. The upper surface of this roll 127 is slightly below the upper surface of the block 14, so that the cut soles, as they are moved off such block by the cross bars 74, will be fed downwardly and to the right, as viewed in Fig. 1, onto an endless belt 128, mounted on rollers 129 on shafts rotating in bearings 130 in the frame 125, said belt 128 having a movement transverse to the movement of the chains 72 and 73. The belt 128 may be of any desired length, the sole blanks falling off the belt into any convenient receptacle, or the belt may be long enough to allow an operator or operators to stand or sit along the side thereof and sort and stack the cut sole blanks into boxes.

On each of the bars 119, on either side of the standards 11, I have pivotally mounted a pair of bell crank levers 131, to one arm of each I have pivotally attached a connecting rod 132, while to the other arm of each lever 131 I have pivotally attached a second connecting rod 133, equal in length to the length of the connecting rod 132, and formed on the bottom of the connecting rod 133 is a shoe 134 bevelled at its forward end, and slightly greater in length than the width of the cutting block. As the cross-bars 74 move along the frame 64, they engage the bevel at the front end of the shoes 134 moving the connecting rod 133 upward, and keeping it in its uppermost position until the cross bars 74 move beyond the rear end of such shoes 134, when such shoes and connecting rods 133 fall by their own weight into their lowermost position. Attached to the right hand bar 119, as viewed in Fig. 2, is a bearing bracket 135, in which is pivotally mounted a bell crank lever, one arm 136 of which extends inward and rests on the top of the connecting rod 133, while the other arm 137 extends downward in position to engage with the spring pressed rod 37, heretofore described. Assuming that the machine is in operation, and that the leather sheets or strips 124 are fed successively beneath the cutter head 15 to be cut into sections, such as shoe sole blanks, it will be obvious that as a cross bar 74 comes into engagement with the bevel on the shoe 134, the connecting rod 133 will be raised, raising the arm 136 of the bell crank lever about the pivot point in the bearing bracket 135, and moving the free end of the arm 137 to the left, as viewed in Fig. 2, against the spring pressed rod 37, thus moving the rod 42 to the left and causing a movement to the left of the roller 45 into the path of movement of the cam 47 attached to the shaft 25. This cam 47 is so positioned on the shaft 25 with relation to the reciprocating movement of the cutter head 15 and the movement of the chains 72 and 73, that assuming the cutter head and chains 72 and 73 to be moving in synchronism, the roller 45 will move out of the path of the cam 47 by the movement of the cross bar 74 past the shoe 134 at the proper instant and the consequent movement to the right, as viewed in Fig. 2, of the spring pressed rod 37. The clutching mechanism, therefore, will be held in operative position as long as the cross bars 74 come successively into and out of position. If, however, one of the cross bars 74 over-runs when coming into position with respect to the cutter head 15, or does not move far enough when the cutting operation is completed, the end of the arm 136 will remain raised and the roller 45 held in position in the path of the cam 47. The cam 47, engaging the roller 45, rotates the shaft 27, and by means of the clutch fork 28 disengages the clutch members 21 and 22 to stop rotation of the shaft 25 and thus prevent downward movement of the cutter head 15, and possible injury to the cutters carried thereby by reason of their engagement with the cross bar 74.

The operation of my improved machine is as follows: The operator stands in front of the machine, operates the handle (not shown) to rotate the shaft 27 and move the clutch operating fork 28 to cause the clutch members 21 and 22 to engage and start the mechanism in operation, the various elements moving in the direction of the arrows shown in the drawings. The operator places the sheets of leather 124 in behind the curved plate 123 and into position between the jaws 114 and 115, which, being below the rollers 106, are separated from each other, as shown in Fig. 15. As the cross bars 74 move upwardly, the triangular members 105 engage with the rollers 106, to rotate the half round shaft 103 from the position shown in Fig. 15 to that shown in Fig. 14, the jaws 114 and 115 thus gripping the sheet or strip of leather 124 in proper position with respect to the cross bars 74. The sheets or strips of leather 124 are moved rearwardly in the machine into proper position onto the bed 13 beneath the cutter head 15, the stroke of the oscillating frame 76 being properly proportioned to accomplish this result. As the cross bars 74 pass under the shoes 134, the roller 45 is positioned, in the manner above described, to throw out the clutch automatically and prevent injury to the cutters in case of improper functioning of the cross-bars 74. Assuming, however, that the machine is functioning properly, the chains 72 and 73 stop with the cross-bars 74 in position, whereupon the cutter head descends, performs its operation and moves upward. The next forward step of the chains 72 and 73, and cross bars 74 takes place, the pieces into which the strip of leather 124 has been cut are fed rapidly from the bed 13 and onto the transverse belt 128, which carries them to any desired point.

While I have necessarily described the preferred embodiment of my invention, somewhat in detail, it is to be understood that I may vary the size, shape and arrangement of parts constituting my improved machine within wide limits without departing from the spirit of the invention.

My invention is further described and defined in the form of claims as follows:

1. An improved leather working machine, comprising a work table, a cutter head, means for reciprocating said cutter head toward and from the work table, an endless belt feeding means, a plurality of cross bars spaced along the length of said endless belt, material gripping devices attached to said cross bars, and means for moving said cross bars and gripping devices successively into position with respect to said work table and cutter head.

2. An improved leather working machine, comprising a work table, a cutter head, means for reciprocating said cutter head toward and from the work table, an endless belt feeding means, a plurality of cross bars spaced along the length of said endless belt, material gripping devices attached to said cross bars, means for moving said cross bars and gripping devices successively into position with respect to said work table and cutter head, and means for operating the gripping devices to grip material before being moved into position with respect to said work table and cutter head.

3. An improved leather working machine, comprising a work table, a cutter head, means for reciprocating said cutter head toward and from the work table, an endless belt feeding means, a plurality of cross bars spaced along the length of said endless belt, material gripping devices attached to said crossbars, means for moving said cross bars and gripping devices successively into position with respect to said work table and cutter head, means for operating the gripping devices to grip material before being moved into position with respect to said work table and cutter head, and means for operating the gripping devices to release the material after the cross bars have been moved out of position beyond the work table and cutter head.

4. An improved leather working machine, comprising a work table, a cutter head operatively associated therewith, means for intermittently and step by step feeding material to said work table, a source of power, clutching means for connecting the cutter head thereto, operating means for the clutching means, and means, controlled by the material feeding means for automatically moving the operating means into position to control the operation of the clutching means.

5. An improved leather working machine, comprising a work-table, a cutter-head operatively associated therewith, means for intermittently and step by step feeding material to said work-table, a source of power, clutching means for connecting the cutter-head thereto, operating means for the clutching means, and means, controlled by the material feeding means, for automatically moving the operating means into position to control the operation of the clutching means in synchronism with the movements of the cutter-head.

In testimony whereof, I have signed my name to this specification.

CHARLES ADRIAN SAWYER, Jr.